United States Patent
Giorgini

(10) Patent No.: US 11,387,511 B1
(45) Date of Patent: Jul. 12, 2022

(54) ELECTRIC CELL POTTING COMPOUND AND METHOD OF MAKING

(71) Applicant: H.B. Fuller Company, St. Paul, MN (US)

(72) Inventor: Albert M. Giorgini, Lino Lakes, MN (US)

(73) Assignee: H.B. Fuller Company, St. Paul, MN (US)

( * ) Notice: Subject to any disclaimer, the term of this patent is extended or adjusted under 35 U.S.C. 154(b) by 0 days.

(21) Appl. No.: 17/654,921

(22) Filed: Mar. 15, 2022

Related U.S. Application Data

(63) Continuation of application No. 17/326,714, filed on May 21, 2021, which is a continuation of application No. 16/277,836, filed on Feb. 15, 2019, now Pat. No. 11,114,719.

(60) Provisional application No. 62/631,584, filed on Feb. 16, 2018.

(51) Int. Cl.
| | |
|---|---|
| *H01M 50/183* | (2021.01) |
| *H01M 50/24* | (2021.01) |
| *H01M 50/116* | (2021.01) |
| *C08J 9/00* | (2006.01) |
| *C08K 5/521* | (2006.01) |
| *C08L 75/06* | (2006.01) |

(52) U.S. Cl.
CPC ......... *H01M 50/183* (2021.01); *C08J 9/0038* (2013.01); *C08K 5/521* (2013.01); *C08L 75/06* (2013.01); *H01M 50/116* (2021.01); *H01M 50/24* (2021.01); *H01M 2200/00* (2013.01)

(58) Field of Classification Search
CPC .................................................. H01M 50/183
See application file for complete search history.

(56) References Cited

U.S. PATENT DOCUMENTS

| | | | |
|---|---|---|---|
| 4,189,544 | A | 2/1980 | Thompson |
| 4,780,482 | A | 10/1988 | Krueger |
| 6,831,112 | B2 | 12/2004 | Kaku et al. |
| 7,862,749 | B2 | 1/2011 | Sjerps |
| 8,642,699 | B2 | 2/2014 | Matsuoka et al. |
| 8,968,895 | B2 | 3/2015 | Hoerpel et al. |
| 9,657,173 | B2 | 5/2017 | Cao et al. |
| 9,806,307 | B2 | 10/2017 | Zheng et al. |
| 11,161,930 | B2 | 11/2021 | Burckhardt et al. |

(Continued)

FOREIGN PATENT DOCUMENTS

| | | |
|---|---|---|
| CN | 103524698 | 1/2014 |
| CN | 106047268 | 10/2016 |

(Continued)

OTHER PUBLICATIONS

Jia Du, et al. ; A Review of Organophosphorus Flame Retardants(OPFRs): Occurance, Bioaccumulation, Toxicity, and Organism Exposure: Jun. 26, 2019; 22126-22136; vol. 26 No. 22; Sp.

*Primary Examiner* — Brian R Ohara
(74) *Attorney, Agent, or Firm* — Daniel J. Barta; Kirsten Stone

(57) ABSTRACT

A battery module comprising an electric cell and a potting compound associated with the electric cell. The potting compound is formed of a flame retardant component; a first component having an isocyanate reactive compound and water; and a second component having an isocyanate compound. The potting compound is a foam.

26 Claims, 6 Drawing Sheets

(56) References Cited

U.S. PATENT DOCUMENTS

| | | |
|---|---|---|
| 2007/0218353 A1* | 9/2007 | Straubel ............... B60L 50/64 429/50 |
| 2011/0184079 A1 | 7/2011 | Milliren et al. |
| 2011/0192564 A1 | 8/2011 | Mommer et al. |
| 2011/0250475 A1 | 10/2011 | Yamamoto et al. |
| 2011/0250476 A1 | 10/2011 | Taga |
| 2012/0001604 A1 | 1/2012 | Nakaminami et al. |
| 2012/0003508 A1 | 1/2012 | Narbonne |
| 2012/0183819 A1 | 7/2012 | Yamamoto et al. |
| 2013/0030140 A1 | 1/2013 | Hirano et al. |
| 2016/0347904 A1 | 12/2016 | Kaluschke et al. |
| 2018/0312625 A1 | 11/2018 | Phanopoulos et al. |
| 2019/0169476 A1 | 6/2019 | Mennecke et al. |
| 2020/0325268 A1 | 10/2020 | Guidetti et al. |
| 2021/0003508 A1 | 1/2021 | Barak et al. |

FOREIGN PATENT DOCUMENTS

| | | |
|---|---|---|
| CN | 106280403 | 1/2017 |
| CN | 106117483 | 7/2019 |
| CN | 107915821 | 1/2021 |
| DE | 4006537 | 3/1990 |
| EP | 2706074 | 3/2014 |
| JP | 58093717 | 6/1983 |
| JP | 2008208348 | 9/2008 |
| JP | 2009263475 | 11/2009 |
| JP | 2013014658 | 7/2011 |
| JP | 2011148903 | 8/2011 |
| JP | 2014043551 | 3/2014 |
| JP | 2015063676 | 4/2015 |
| JP | 2018053024 | 4/2018 |
| JP | 2018206604 | 12/2018 |
| JP | 2019019302 | 2/2019 |
| WO | WO2018026506 | 2/2018 |

* cited by examiner

ELECTRIC CELL POTTING COMPOUND AND METHOD OF MAKING

CROSS-REFERENCE TO RELATED APPLICATIONS

This application is a Continuation of pending U.S. patent application Ser. No. 17/326,714, filed May 21, 2021, a Continuation of U.S. application Ser. No. 16/277,836 filed on Feb. 15, 2019, now Granted U.S. Pat. No. 11,114,719, incorporated herein.

FIELD

The present disclosure relates to battery modules that include an electric cell positioned in a potting compound. More particularly, the present disclosure relates to battery modules that include an electric cell positioned in a foam potting compound that contains a flame retardant.

BACKGROUND

In general, potting is the process of partially or completely filling or embedding an enclosure with a material for the purpose of maintaining objects within the enclosure in spatial relationship to one another and to the enclosure. Potting may be used to provide resistance to shock and vibration. Certain compositions used for potting may be designed for creating a seal against moisture, solvents, and corrosive agents.

Materials used to form potting compounds vary in hardness from very soft to hard and rigid and are designed to withstand various environments. Potting compounds for use in potting electric cells may be designed to provide mechanical stability and shock tolerance, for example for battery modules intended for use in a vehicle. A potting compound that provides mechanical stability to an electric cell while adding minimal weight to the battery module is desired. A potting compound for use in a battery module that provides mechanical stability to an electric cell and is flame retardant is also desired.

SUMMARY

Disclosed herein is a battery module comprising an electric cell and a potting compound associated with the electric cell. The potting compound is formed of a flame retardant component; a first component having an isocyanate reactive compound and water; and a second component having an isocyanate compound. The potting compound is a foam after curing.

The potting compound may have at least a V2 level flame resistance as measured by the UL 94 Test for Flammability of Plastics. The potting compound may have a foam density of less than 0.50 g/cm$^3$. The flame retardant component may be present in an amount of at least 15 wt. %, based on the total weight of the potting compound. The flame retardant component may be present in an amount of at least 30 wt. %, based on the total weight of the potting compound. A potting composition configured to form the potting compound may have sufficient flowability before curing to settle at a level height around the electric cell.

The first component may have a viscosity from greater than one to less than 100,000 cP. The second component may have a viscosity from greater than one to less than 50,000 cP at a temperature from about 25° C. to about 35° C. The first component may have a viscosity from greater than one to less than 1,500 cP. The second component may have a viscosity from greater than one to less than 1,000 cP at a temperature from about 25° C. to about 35° C.

Also disclosed herein is a battery module comprising an electric cell positioned in a potting compound. The potting compound may be formed from the reaction product of a first component having an isocyanate reactive compound; and a second component having an isocyanate compound. The potting compound may further include a blowing agent, and a liquid flame retardant component present in an amount from about 15 wt. % to about 60 wt. % based on the total weight of the potting compound.

The liquid flame retardant may include a phosphate ester. The isocyanate reactive compound may be a polyether polyol. The isocyanate reactive compound may have an isocyanate reactive functionality of three or more. The isocyanate compound may have an average isocyanate functionality of two or greater.

The first component may have a viscosity from greater than one to less than 100,000 cP. The second component may have a viscosity from greater than one to less than 50,000 cP at a temperature from about 25° C. to about 35° C. The first component may have a viscosity from greater than one to less than 1,500 cP. The second component may have a viscosity from greater than one to less than 1,000 cP at a temperature from about 25° C. to about 35° C.

Also disclosed herein is a battery module comprising a first electric cell positioned in a polyurethane foam potting compound. The potting compound has a density of less than 0.50 g/cm$^3$. The foam potting compound has at least a V2 level flame resistance as measured by the UL 94 Test for Flammability of Plastics. The potting compound may be formed from a potting composition that has sufficient flowability before curing to disperse to a substantially level height between the first electric cell and a battery module case positioned around the first electric cell.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

DETAILED DESCRIPTION

Figure 1:
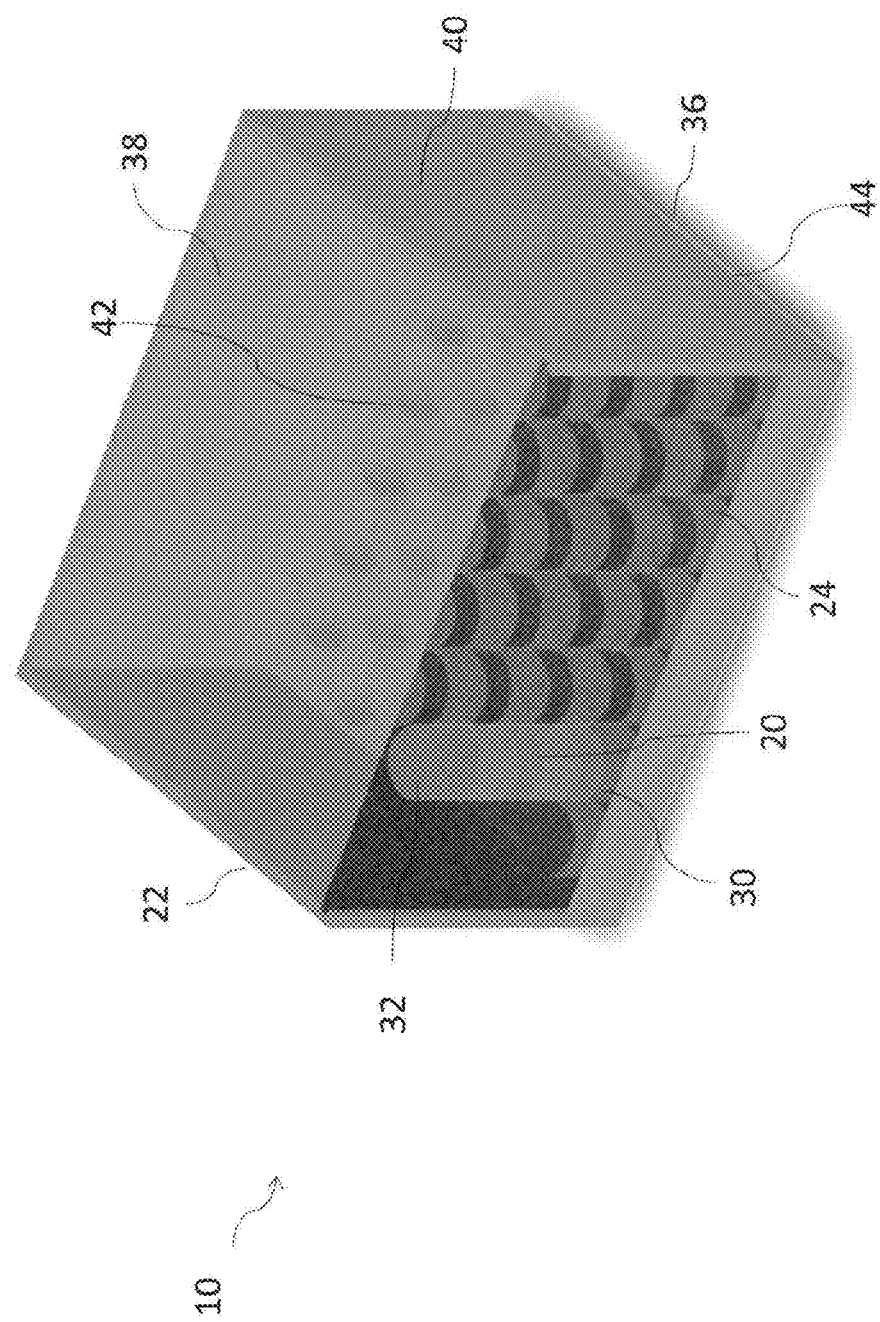
FIG. 1 is a perspective view of a battery module, in accordance with certain embodiments.

Disclosed herein is a potting compound that is low density and is flame retardant. The potting compound has at least a V2 level flame resistance as measured by the UL 94 Test for Flammability of Plastics. In some instances, the potting compound has at least a V1 level flame resistance as measured by the UL 94 Test for Flammability of Plastics. In some embodiments, the potting compound has at least a V0 level flame resistance as measured by the UL 94 Test for Flammability of Plastics.

The potting compound may be formed from a potting composition that is applied as a liquid and cures to form the potting compound. The potting composition has sufficient flowability before curing to allow the potting composition to be applied as a liquid around an electric cell and then settle at a substantially level height around the electric cell. The potting composition disclosed herein can be applied as a liquid and flow around the electric cell and through the spaces defined between adjacent electric cells before curing to form the potting compound. The potting compound is useful for potting an electric cell and forming a battery module that is lightweight. The potting compound is useful to pot an electric cell and provide mechanical stability and flame retardancy after curing.

The potting compound may be formed from materials that form foams when cured, including silicones, epoxies, for example a one- or two-component epoxy resin, or polyurethanes. In some embodiments, the potting compound includes a polyurethane foam. The potting compound may be formed from a polyurethane composition that is a liquid before curing, and which cures and hardens as a foam to form the potting compound. In some embodiments, the potting compound is formed from a polyurethane foam that has low density and includes a flame retardant.

As used herein a foam is defined as a substance formed from a bulk material which defines the cavities throughout the substance. The cavities may be filled with gas, such as air, oxygen, carbon dioxide, nitrogen, or any suitable gas. The cavities form a cellular structure throughout the bulk material. For example, the potting composition may be a liquid mixture formed of components that react with each other and release a gas that forms bubbles throughout the liquid. The liquid potting composition hardens when cured to form a solid potting compound that is a solid substance having cavities throughout the solid substance. The cavities result in the solid substance having a lower density than if the solid substance were completely formed of the bulk material without the cellular structure. The foam can be closed-cell or open-cell. Closed-cell refers to a foam having cavities that form discrete pockets completely surrounded by solid material. Open-cell refers to a foam having cavities that form pockets that connect to each other.

It is further contemplated, that in some instances, a low density potting compound may be formed with a bulk substance which includes expanded or unexpanded microballoons, e.g. syntactic foams. For example, solid particles formed from glass or polymeric materials may be used to form a three dimensional shape, such as a bead or bubble, defining a gas-filled center. The beads or bubbles may be distributed throughout a bulk substance that can cure and entrap the beads or bubbles, thus decreasing the overall density of the cured potting compound.

After curing, the potting compound that is a foam has a lower density than the density of the potting composition that is a liquid. In some embodiments, the potting compound has a density of less than about 0.60 $g/cm^3$, less than about 0.50 $g/cm^3$, less than about 0.40 $g/cm^3$, less than about 0.30 $g/cm^3$, less than about 0.20 $g/cm^3$, less than about 0.10 $g/cm^3$, or less than about 0.05 $g/cm^3$ after curing. For example, the potting compound may be a foam having a foam density from about 0.02 $g/cm^3$, about 0.05 $g/cm^3$, about 0.10 $g/cm^3$, about 0.20 $g/cm^3$, to about 0.30 $g/cm^3$, about 0.40 $g/cm^3$, or about 0.50 $g/cm^3$, or a density between any pair of the foregoing values, although potting compounds having additional densities are further contemplated.

The potting composition may be a two-part composition formed from a first component that is reacted with a second component. At least one of the first component or the second component may contain a flame retardant. The first component and the second component may be selected to form a thermoplastic polyurethane component (TPU). After mixing the first component and the second component, the potting composition may be a blend of a polyurethane component and a liquid flame retardant component. The first and/or second component may also contain one or more additional additives.

The First Component

The first component is a liquid at room temperature (between about 25° C. and about 35° C.). For example, the first component has a viscosity from greater than 1 to less than 100,000 centipoise (cP), at room temperature. In some embodiments, the first component has a viscosity from about 100 cP, about 200 cP, about 300 cP or about 400 cP, to about 1100 cP, about 1200 cP, about 1300 cP, or about 1400 cP, about 10,000, about 20,000, about 30,000, about 40,000, or as great as 100,000 or a viscosity between any pair of the foregoing values, although components having alternative viscosities are further contemplated.

The first component includes one or more isocyanate reactive compounds. The isocyanate reactive compound may be a compound containing an active hydrogen, for example an amine, an alcohol, or thiol. The first component includes an isocyanate reactive compound having a functionality of two or more. Preferred isocyanate reactive compound are those having a functionality of three or more. Suitable isocyanate reactive compounds are those that are liquid at room temperature. Preferred isocyanate reactive compounds are those that have a low viscosity at room temperature. For example, suitable isocyanate reactive compounds may have a viscosity from greater than one to less than about 800 cP, less than about 700 cP, less than about 600 cP, or less than about 500 cP, at room temperature. Preferred examples of isocyanate reactive compounds include those that have a viscosity of less than about 200 cP, less than about 190 cP, less than about 180 cP, or less than about 170 cP, at room temperature (between about 25° C. and about 35° C.).

The isocyanate reactive compound may be a polyol. The isocyanate reactive compound may be a combination of two or more polyols. For example, the isocyanate reactive compound may be a diol polyol, a triol polyol, tetra polyol or a higher order polyol, and combinations thereof. Preferred examples of polyols that may be used as the isocyanate reactive compound include those that have a low viscosity at room temperature.

The polyol may be selected from the group consisting of a polyether polyol and a polyester polyol. Suitable polyether polyols include, but are not limited to, polyoxyalkylene polyols such as polyethylene glycol, polypropylene glycol, polytetramethylene glycol, polybutylene glycol, and mixtures and combinations thereof. In some embodiments, a suitable polyether may have a number average molecular weight ($M_n$) from about 200, about 300, about 400, about 600, to about 800, about 1,000, about 4,000, or about 6,000, or a molecular weight between any pair of the foregoing values, although polyethers having additional molecular weights are further contemplated.

In some embodiments, suitable polyols may include polyhydroxy ethers, including substituted or unsubstituted polyalkylene ether glycols or polyhydroxy polyalkylene ethers;

polyhydroxy polyesters; the ethylene or propylene oxide adducts of polyols and the monosubstituted esters of glycerol; polymer polyols, for example graft polyols containing a proportion of a vinyl monomer, polymerized in situ; and mixtures and combinations thereof. Further examples of suitable polyols include poly(diethylene glycol adipate).

In some embodiments, a homopolymer and a copolymer of polyoxyalkylene may be used. In some embodiments, copolymers of the polyoxyalkylene polyols may include an adduct of at least one compound including ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris (hydroxyphenyl)propane, triethanolamine, triisopropanolamine; and one compound including ethylene oxide, propylene oxide and butylene oxide.

In some embodiments, a suitable polyester polyol can be formed from the reaction of one or more polyhydric alcohols having from about two to about 15 carbon atoms with one or more polycarboxylic acids having from about two to about 14 carbon atoms. Examples of suitable polyhydric alcohols include ethylene glycol, propylene glycol such as 1,2-propylene glycol, 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol mono ethyl ether, diethylene glycol, 2-ethylhexanediol, 1,4-cyclohexanediol, 1,2,6-hexanetriol, 1,3,5-hexanetriol, 1,3-bis-(2-hydroxyethoxy) propane and similar components.

In some embodiments, the isocyanate reactive compound is present in the first component in a weight percent from about 20 percent, about 30 percent, or about 40 percent, to about 70 percent, about 80 percent, about 90 percent, or about 100 percent, or a weight percent between any pair of the foregoing values, based on the total weight of the first component. In preferred embodiments, the isocyanate reactive compound is present in the first component in a weight percent from about 20 percent, about 25 percent, or about 30 percent, to about 35 percent, about 40 percent, about 45 percent, or about 50 percent, or a weight percent between any pair of the foregoing values, based on the total weight of the first component. In embodiments having more than one isocyanate reactive compound, the total amount of all isocyanate reactive compounds present in the first component have a combined weight percent from about 20 percent, about 30 percent, or about 40 percent, to about 70 percent, about 80 percent, about 90 percent, or about 100 percent, or a weight percent between any pair of the foregoing values, based on the total weight of the first component.

Suitable commercially available polyols that may be used to form the polyurethane potting composition include the triol polyether polyol sold under the trade name POLY-G 30-240 (available from Monument Chemical Group, located in Houston, Tex.), the triol polyether polyol sold under the trade name VORANOL 230-238 (available from the Dow Chemical Company, located in Midland Mich.), and the polyether polyol sold under the trade name ARCOL LHT-240 (available from Covestro AG, located in Leverkusen, Germany).

The Second Component

The second component is a liquid at room temperature (between about 25° C. and about 35° C.). The second component has a viscosity from greater than one to less than 50,000 centipoise (cP), at room temperature. For example, the second component may have a viscosity from about 40 cP, about 60 cP, about 80 cP or about 100 cP, to about 600 cP, about 700 cP, about 800 cP, about 900 cP, about 1000, about 10,000, about 20,000, about 30,000, or as great as about 50,000 at room temperature (between about 25° C. and about 35° C.), or a viscosity between any pair of the foregoing values, although components having alternative viscosities are further contemplated. In a preferred embodiment, the second component has a viscosity no greater than 200 cP at room temperature.

The second component includes an isocyanate compound. The isocyanate compound has an average isocyanate functionality of two or greater. Preferred isocyanate compounds include those that are liquid at room temperature including those having a viscosity no greater than 300 cP, no greater than about 200 cP, or no greater than about 100 cP, at room temperature (from about 25° C. to about 35° C.). In some embodiments, the isocyanate compound may be a monomer. In some embodiments, the isocyanate compound may be a prepolymer. For example, the isocyanate compound may be a polymer that is reacted with an isocyanate compound, such as an isocyanate terminated oligomer. In some embodiments, the isocyanate compound may be a polymeric isocyanate.

Suitable isocyanate compounds include, but are not limited to, aromatic isocyanates such as aromatic diisocyanates, or aliphatic isocyanates such as aliphatic diisocyanates. In some embodiments, the isocyanate compound has from one to 10 aliphatic or aromatic groups substituted by the isocyanate group.

Suitable isocyanate compounds include methylene diphenyl isocyanate compounds such as diphenyl methane diisocyanate including its isomers, methylene diphenyl diisocyanate (MDI), carbodiimide modified MDI, hydrogenated methylene diphenyl isocyanate (HMDI), hexamethylene diisocyanate (HDI), isophorone diisocyanate (IPDI), polymeric methylene diphenyl isocyanate, diphenylmethane-4,4'-diisocyanate, diphenylmethane-2,2'-diisocyanate, diphenylmethane-2,4'-diisocyanate, and other oligomeric methylene isocyanates; toluene diisocyanate compounds (TDI) including isomers thereof, tetramethylxylene diisocyanate (TMXDI), isomers of naphthylene diisocyanate, isomers of triphenylmethane triisocyanate, and mixtures and combinations thereof, although additional isocyanates are further contemplated. In some instances, aliphatic di, tri, and polyisocyanates are also suitable isocyanate compounds, including, for example, hydrogenated aromatic diisocyanates, aliphatic polyisocyanates, or cycloaliphatic polyisocyanates, although additional isocyanates are further contemplated. Suitable isocyanate compounds that are commercially available include the modified liquid MDI sold under the trade name ISONATE 143L (available from The Dow Chemical Company, located in Midland, Mich.), or the polymeric MDI sold under the trade name RUBINATE M (available from Huntsman Corporation, located in The Woodlands, Tex.).

In some embodiments, the isocyanate compound is present in the second component in a weight percent from about 20 percent, about 30 percent, or about 40 percent, to about 70 percent, about 80 percent, about 90 percent, or about 100 percent, or a weight percent between any pair of the foregoing values, based on the total weight of the second component. In a preferred embodiment, the isocyanate compound is present in the second component in a weight percent from about 50 percent, about 55 percent, or about 60 percent, to about 70 percent, about 75 percent, about 80 percent, or about 85 percent, or a weight percent between any pair of the foregoing values, based on the total weight of the second component. In embodiments having more than one isocyanate compound, the total amount of all isocyanate compounds present in the second component have a combined weight percent from about 20 percent, about 30 percent, or about 40 percent, to about 70 percent, about 80 percent, about 90 percent, or about 100 percent, or a weight percent between any pair of the foregoing values, based on the total weight of the second component.

Blowing Agent

The potting composition includes a blowing agent. Suitable blowing agents are those that can react with the remaining components of the potting composition to create pockets of gas in the potting composition that form cavities when the potting compound is cured. Chemical blowing agents include water, azodicarbonamide (e.g., for vinyl), hydrazine and other nitrogen-based materials for thermoplastic and elastomeric foams, and sodium bicarbonate for thermoplastic foams. In some embodiments, the blowing agent may be a gas. For example, the blowing agent may be a gas that is injected into the battery potting composition to create pockets of gas in the potting composition once the components of the potting composition are mixed. Suitable blowing agents that may be injected into the battery potting composition include nitrogen or carbon dioxide.

In some embodiments, the blowing agent may be a liquid. In some embodiments, the blowing agent is water. For example, in the case of the potting compound being formed from polyurethane, water may be included to react with the polyurethane forming components to form carbon dioxide gas when the polyurethane components are mixed. The carbon dioxide gas forms bubbles in the liquid potting composition. The bubbles form cavities in the polyurethane after it cures and hardens, resulting in a foam potting compound. In some embodiments, the blowing agent is present in the potting composition at a weight percent from greater than zero, about 0.1 percent, about 0.5 percent, or about 1.0 percent, to about 1.5 percent, about 2.0 percent, about 2.5 percent, or about 3.0 percent, or a weight percent between any pair of the foregoing values, based on the total weight of the first component. In some embodiments, the blowing agent may be included in the first component. For example, in some embodiments, the blowing agent may be a liquid blowing agent included in the first component.

The Flame Retardant Component

The potting composition includes a flame retardant component. The flame retardant component is preferably a liquid at room temperature. In some embodiments, the potting composition includes two or more flame retardant components. The flame retardant component may be present in one or both of the first or second components. In some embodiments, the first component may include a first flame retardant component and the second component may include a second flame retardant component.

Suitable flame retardant components may include those having a viscosity from about 30 cP, about 40 cP, about 100 cP, about 200 cP, about 300 cP or about 400 cP, to about 600 cP, about 700 cP, about 800 cP, or about 900 cP, or about 2000 cP, or a viscosity between any pair of the foregoing values at room temperature (between about 25° C. and about 35° C.), although liquid flame retardants having alternative viscosities are further contemplated. Preferred liquid flame retardant components include those having a viscosity no greater than about 300 cP at room temperature. For example, preferred liquid flame retardant components include those having a viscosity from about 40, about 60, or about 80, or about 100, to about 150, about 200, about 250, or about 300, or a viscosity between any pair of the foregoing values at room temperature, although flame retardants having additional viscosities are further contemplated.

In some embodiments, the flame retardant component includes a phosphate ester. The flame retardant component may include a halogenated phosphate ester. The flame retardant component may include one or both of a brominated phosphate ester or a chlorinated phosphate ester. For example, a suitable liquid flame retardant may be tris (2-chloroisopropyl) phosphate.

The flame retardant component may include other examples of brominated organic compounds including brominated diols, brominated mono-alcohols, brominated ethers, brominated phosphates, and combinations thereof. Suitable brominated organic compounds may include tetrabromobisphenol-A, hexabromocyclododecane, poly(pentabromobenzyl acrylate), pentabromobenzyl acrylate, tetrabromobisphenol A-bis(2,3-dibromopropyl ether), tribromophenol, dibromoneopentyl glycol, tribromoneopentyl alcohol, tris(tribromoneopentyl) phosphate, and 4,4'-isopropylidenebis[2-(2,6-dibromophenoxy) ethanol].

In some embodiments, a suitable commercially available flame retardant component may be the chlorinated phosphate ester sold under the trade name FYROL PCF (from ICL Industrial Products, located in St. Louis, Mo.).

The flame retardant component is present in at least one of the first or second component. The flame retardant component may be present in at least one of the first or second component at a weight percent from greater than zero percent, about 10 percent, about 20 percent, or about 30 percent, to about 40 percent, about 50 percent, or about 60 percent, about 70 percent, or a weight percent between any pair of the foregoing values, based on the total weight of the component (either the first or the second component) that the flame retardant component is present in. In some embodiments, the flame retardant component may be present in both the first component and the second component.

In some embodiments, the total amount of the flame retardant component in the potting composition is a weight percent from about 15 percent, about 20 percent, about 25 percent, or about 30 percent, to about 40 percent, about 45 percent, about 50 percent, about 55 percent, or about 60 percent, or a weight percent between any pair of the foregoing values, based on the total weight of the potting composition. For example, a first flame retardant component may be present in the first component at a weight percent from about 30 percent, about 35 percent, or about 40 percent, to about 45 percent, about 50 percent, or about 55 percent, or a weight percent between any pair of the foregoing values, based on the total weight of the first component; and a second flame retardant component may be present in the second component at a weight percent from about 20 percent, about 25 percent, or about 30 percent, to about 35 percent, about 40 percent, or about 45 percent, or a weight percent between any pair of the foregoing values, based on the total weight of the second component.

It has been found that in some instances, a suitable amount of flame retardant component in the potting composition will provide suitable levels of flame retardancy without compromising other desirable characteristics. For example, in some instances the stiffness, hardness, flexibility, durability, or structural resilience of certain foam compounds may be unsuitable when high levels of flame retardant is present. In some embodiments, a suitable weight percent of flame retardant component in a polyurethane foam to provide a suitable level of flame retardancy and providing a suitably strong potting compound may be an amount of from about 25 percent, about 30 percent, or about least 35 percent, to about 40 percent, about 45 percent, or about 50 percent based on the total weight of the potting composition.

Optional Additional Additives

The potting composition may optionally include additional additives, either as separate components or mixed into one or more of the components described above to form the first and/or second component. The optional additional additives may be present in the potting composition at a weight percent from greater than zero, about 0.1, about 0.5, or about one, to about five, about 10, about 20 percent, or about 30 percent, based on the total weight of the potting composition, or a weight percentage between any pair of the foregoing values. The weight percentage of the option additional additives may be applied to the combined total of all additional additives present or to each additional additive separately.

Some examples of additional additives that may be added to either or both of the first or second components include, but are not limited to, crosslinkers, chain extenders, humectants, thixotropes, nucleating agents, surfactants, diluents, anti-settling agents, flame-retardant enhancers, and components and combinations thereof. In some embodiments, the optional additional additives include waxes, release agents, antioxidants, reinforcing fillers, pigments, heat stabilizers, UV stabilizers, plasticizers, rheology modifiers, processing aids, lubricants, mold release agents, or components or combinations thereof. Suitable reinforcing fillers include mineral fillers and glass fibers.

Further examples of additional components include catalysts. In the example of a polyurethane potting composition, any conventional catalyst known to those of skill in the art can be used to react the isocyanate compound with the isocyanate reactive compound and the remaining components. Suitable catalysts include, but are not limited to, triol catalysts, tetra polyol catalysts, or tertiary amine catalysts. Further examples of suitable catalysts include the various alkyl amines, alkyl ethers or alkyl thiol ethers, such as those of bismuth or tin, wherein the alkyl portion has from one to about 20 carbon atoms. Some examples include bismuth octoate, bismuth laurate, and the like. Other catalysts include the various tin catalysts such as stannous octoate, dibutyltin dioctoate, dibutyltin dilaurate, and the like.

In the example of a polyurethane potting composition, the amount of a catalyst present may from greater than zero, about 0.02, about 0.05, or about 0.1, to about 0.25, about 0.75, or about one percent, based on the total weight of the battery potting composition, or a weight percent between any pair of the foregoing values. In some embodiments, a cross linker or humectant may be present in the potting composition at a weight percent from greater than zero, from about 0.1, about 0.5, or about one, to about five, about seven, or about 10 percent, based on the total weight of the potting composition, or a weight percent between any pair of the foregoing values. In some embodiments, a surfactant, for example suitable for stabilizing the foam structure or for helping with wet out, may be present in the potting composition at a weight percent from greater than zero, from about 0.1, about 0.5, or about one, to about two, about three, or about four percent, based on the total weight of the potting composition, or a weight percentage between any pair of the foregoing values. In some embodiments, a nucleating agent may be present in the battery potting composition at a weight percent from greater than zero, from about 0.1, or about 0.5, to about one, about 1.5, or about two percent, based on the total weight of the battery potting composition, or a weight percent between any pair of the foregoing values.

The first and second component are combined to form the potting composition having the flame retardant component. For example, in the embodiment of a polyurethane used to form the foam potting composition, the first and second component are mixed to form the polyurethane. The polyurethane may be present in the potting composition at a weight percent from about 30 percent, about 40 percent, or about 50 percent, to about 60 percent, about 70 percent or about 80 percent, or a weight percent between any pair of the foregoing values, based on the total weight of the potting composition. In some instances, one technique for calculating the amount of polyurethane present in the potting composition is to use a theoretical calculation based on the starting components. That is, the weight percentage of all the components that would form the polyurethane (if the starting components were to produce a 100% yield of polyurethane) are added up. The total amount of those components is then taken as a weight percent of the total amount of the potting composition to arrive at the polyurethane weight percent in the potting composition.

Any known processes to react the first component with the second component may be used. In embodiments comprising a polyurethane potting composition, any known processes for combining the first and second component to make the polyurethane foam may be used. In some embodiments, the process for combining may be a "one-shot" process where all the reactants are mixed in a mixing vessel, such as a bucket or a reactor, and reacted and/or applied.

In some embodiments, the ratio of the weight amount of the isocyanate compound to the total equivalent weight amount of the isocyanate reactive component may be from about 0.60, about 0.65, about 0.70, or about 0.75, to about 0.80, about 0.85, about 0.90, or about 0.95, or a ratio between any pair of the foregoing values. In some embodiments, the ratio of isocyanate compound to isocyanate reactive compound is chosen such that an excess of reactive isocyanate equivalents in relation to the total number of isocyanate reactive groups on the isocyanate reactive compound is used.

In some embodiments, the polyol of the first component may be present in the potting composition in a weight percent of from about 10 percent, about 20 percent, about 30 percent or about 40 percent, to about 50 percent, about 60 percent, about 70 percent, or about 80 percent, or a weight percent between any pair of the foregoing values.

FIG. 1 is a perspective view of an example battery module 10. As shown in FIG. 1, the battery module 10 includes an electric cell 20 and a battery case 22. In some embodiments, the electric cell 20 may be positioned within the battery case 22 and potted in a potting compound 24. The electric cell 20 may be any suitable shape which generally has a bottom 30, a top 32 and a length defined therebetween. The battery case 22 may be any suitable shape for retaining the electric cell 20, and which generally has a bottom 36, a top 38, and a wall 40 defined therebetween. The bottom 36 of the battery case 22 defines an inner surface and an outer surface; the wall 40 of the battery case defines an inner surface and an outer surface. The battery case 22 defines an enclosed space having an internal volume. The potting compound 24 is positioned within the battery case 22 and occupies a portion of the internal volume of the battery case 22. The potting compound 24 generally has a top 42, a bottom 44, and a height defined therebetween.

Figure 2:
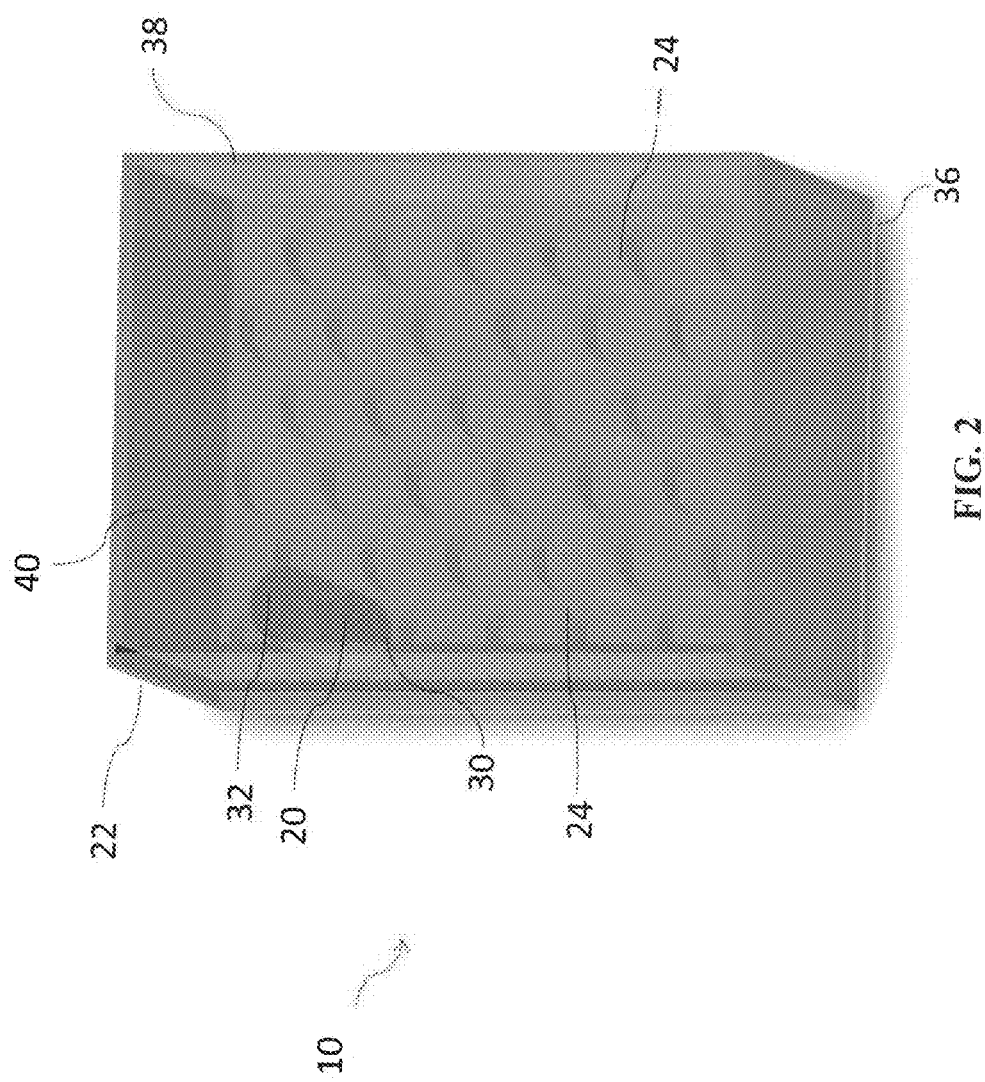
FIG. 2 is a top view of a battery module, in accordance with some embodiments.

FIG. 2 is a top view of the battery module 10, shown in FIG. 1. As shown in FIG. 2, the battery case 22 forms an enclosed space that is large enough to surround the electric cell 20 and other components such as wires or connections.

The enclosed space defines the internal volume of the battery case 22. The bottom 36 of the battery case 22 may be closed and contain any contents of the enclosed space. The top 38 of the battery case 22, may define an opening. The top 38 and/or the opening may be shaped and sized to receive a cover that can be closed to separate the internal volume of the enclosed space from the outside of the battery case 22. The cover may be configured to seal off the internal volume of the enclosed space from the outside of the battery case 22 to prevent entry of potential hazards such as fluids or flames. The battery case 22 may be designed and configured to provide mechanical or structural support to the electric cell 20. The battery case 22 may also be configured to provide protection from moisture, heat, cold, or any other potential factors that may cause damage to the electric cell 20.

As shown, in one possible arrangement, the electric cell 20 may be shaped as a cylinder. In further examples, the electric cell 20 may be formed into any suitable shape or size, as the need may be, such as a cube, sphere, pyramid, etc. The electric cell shown in FIG. 1 is shaped as a cylinder having the bottom 30, the top 32, and a wall extending between the bottom 30 and the top 32. The bottom 30 may be a positive terminal or may be a negative terminal of the electric cell 20, depending on the desired orientation. As shown, the bottom 30 of the electric cell 20 is positioned in the potting compound 24. The potting compound 24 occupies a portion of the internal volume of the battery case 22 and extends a substantially equal distance at various points along the wall 40 from the bottom 36 of the battery case 22 toward the top 38.

Electric cells may be used to form a battery. For example, multiple electric cells may be combined to form a single battery that has a higher voltage or amperage than a single electric cell.

Figure 3:
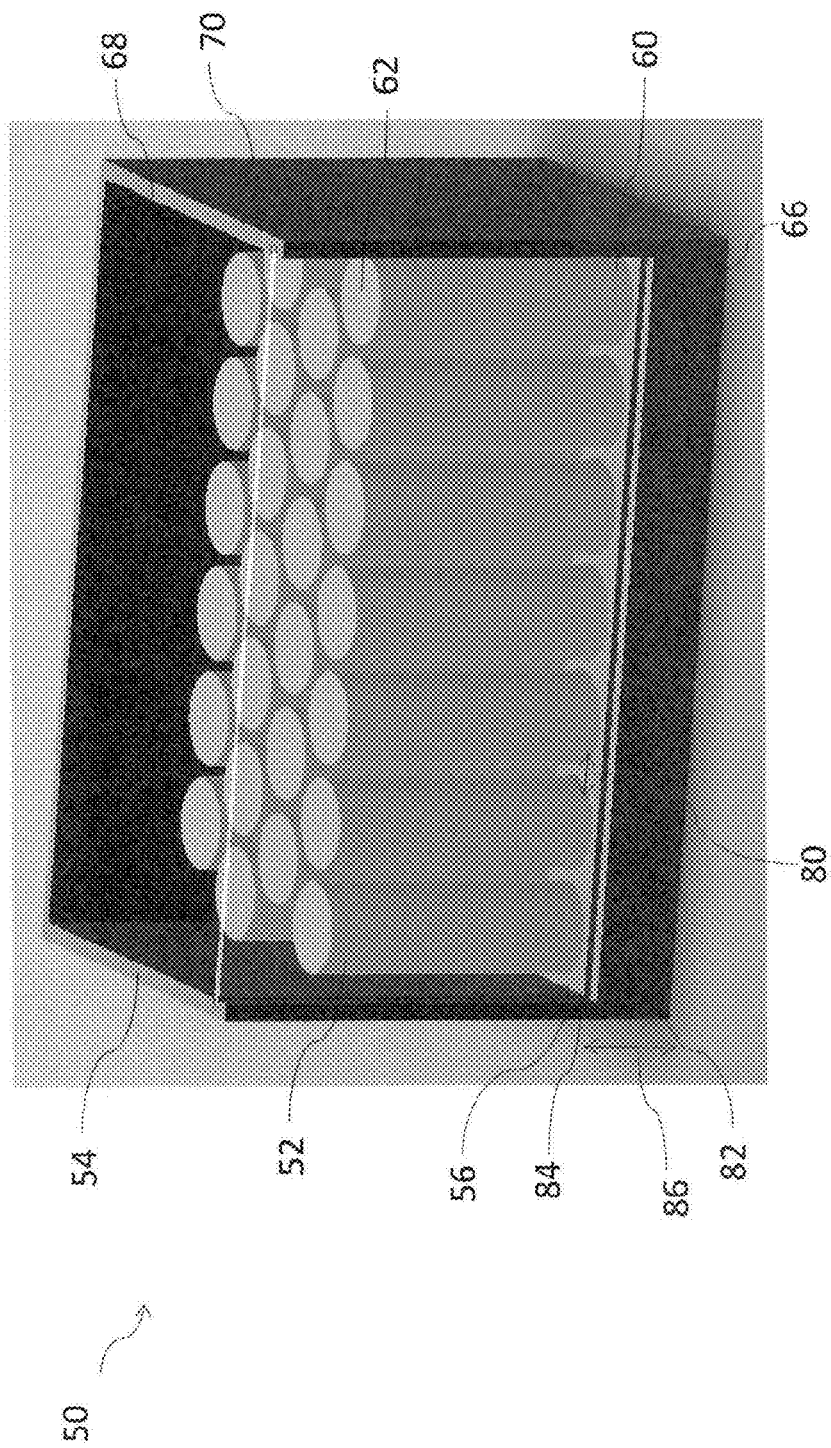
FIG. 3 is a front view of a battery module, in accordance with some embodiments.

FIG. 3 is a front view of a battery module 50 that includes electric cells 52. Each of the electric cells 52 has a bottom 60, a top 62, and wall therebetween defining a length. The electric cells 52 may be positioned within a battery case 54. The electric cells 52 define a gap 80 between each electric cell and an adjacent electric cell. The gap 80 has a width. The battery case 54 has a bottom 66, a top 68 and a wall 70 therebetween. The bottom 66, and the wall 70 define an enclosed space. The enclosed space of the battery case 54 defines an internal volume. The internal volume of the battery case 54 has a suitable volume to receive the electric cells 52 and a potting compound 56. The potting compound 56 has a bottom 82, a top 84, and a height 86 therebetween. The bottom 82 of the potting compound 56 is adjacent to the inside surface of the bottom 66 of the battery case 54. As shown, the top 84 of the potting compound 56 is between the bottom 66 and the top 68 of the battery case 54. Typically, the top 84 of the potting compound 56 is lower than the top 62 of the electric cells 52, although it is envisioned that in an alternative arrangement, the top 62 of the electric cells 52 may be lower than the top 84 of the potting compound 56.

As shown, multiple electric cells 52 may be arranged in close proximity to each other, with each of the electric cells 52 oriented with similarly charged terminals pointed in the same direction. Wires may be attached to the ends of the electric cells 52. The wires may be combined in electric communication such that the electric current from the electric cells 52 is combined, for example to form a battery having a combined current or voltage. The battery module 50 may be used to power any of a number of applications, such as a household appliance, outdoor electrical equipment, or a vehicle such as a car or a boat.

To combine the electric cells 52 to form a battery, the electric cells 52 are connected with wires that conduct an electric current from the electric cells 52. The electric cells 52 are often arranged next to each other, for example in rows or stacked, to form an orderly arrangement for ease of use and/or for connecting the wires to the electric cell terminals. In the interest of conserving space, and to form a compact battery, the electric cells 52 may be positioned in close proximity to each other. For example, the electric cells 52 may be arranged in rows or as a grid, with the positive and negative terminals oriented in the same direction. The electric cells 52 may be positioned in an ordered arrangement and contained within the battery case 54, although it is envisioned that in some instances, a battery module may be formed without a battery case 54. For example, the electric cells 52 could be held together using an alternative securing device, such as a wire, string, band, etc. to hold the electric cells 52 in a bundle, for example.

In some instances, it may be desired to have a battery that is portable, for instance in the case of a battery to start an ignition for, or to power a vehicle, such as a motorcycle, a car, or a boat, as some examples. In instances where the battery is desired to be portable, it is typically preferred to provide a battery that is structurally stable and made to withstand forces such as shock and/or vibrations. In some instances, it is also desired to provide a battery that is made to withstand extreme temperatures, including temperatures outside the normal operating temperature of the battery. For example, in some instances, the battery may be subjected to high heat, and possibly open flames. One possible source of flames may be one or more of the electric cells, for instance as a result of an electric short or if the structure of the electric cell wall is compromised. One example device that may be used to protect the electric cells 52 is the potting compound 56. The potting compound 56 may be associated with the electric cells 52, such as positioned around the electric cells 52 along one or more of the top, the bottom, or the wall of the electric cell. The electric cell or electric cells 52 may be encased or embedded in the potting compound 56 which holds the electric cells 52 in spatial relationship to one another and/or in spatial relationship to the battery case 54.

As shown in FIG. 3, the electric cells 52 are positioned in the potting compound 56. The potting compound 56 is positioned around each of the electric cells 52. In instances where the battery contains multiple electric cells 52, the potting compound 56 can be positioned around each electric cell, and in the gap 80 or spaces defined between individual electric cells 52. In instances where the battery is contained within the battery case 54, the potting compound 56 may be positioned between the electric cell or electric cells 52 and the battery case 54. The potting compound 56 may be positioned to provide suitable structural or mechanical support to the electric cells 52.

In some instances, the electric cells 52 may be positioned with a suitable distance between adjacent electric cells 52 such that individual electric cells 52 are thermally and/or fluidly isolated from each other in the event of a leak or fire. In some instances, the electric cells 52 may be positioned with a suitable distance between adjacent electric cells 52 such that a suitable thickness of potting compound 56 is positioned between adjacent electric cells 52 to provide sufficient shock dampening to prevent damage to the electric cells 52. The size of the space or gap 80 between adjacent electric cells 52 and/or the battery case 54 can be selected based on a number of variables, including but not limited to, the size and/or weight of each electric cell, the operating temperature of each electric cell, the dimensions of each electric cell, and the intended use of the battery module 50. In some examples, the size of the space between adjacent electric cells may be from greater than 0 mm, about 0.25 mm, about 0.50 mm, about 0.75 mm, to about 1.0 mm, about 1.5 mm, or about 2.0 mm, or a length between any pair of the foregoing values, although battery modules having additional configurations are further contemplated. In some examples, the size of the space between an electric cell and the battery case may be from greater than 0 mm, about 1.0 mm, about 2.0 mm, about 3.0 mm, to about 10 mm, about 12 mm, or about 14 mm, although battery modules having additional configurations are further contemplated.

In some embodiments, the potting compound 56 may be formed by first shaping a material such as a potting composition into a suitable shape with spaces defined by the potting compound 56 for holding one or more electric cells 52. The potting compound 56 may be formed by shaping a potting composition with a size and shape such that the potting compound 56 is positioned within the battery case 54 and defining one or more spaces to hold one or more electric cells 52 positioned in the spaces.

In some embodiments, the potting compound 56 may be formed by first arranging the electric cells 52 into the desired final position, held together with wire or within the battery case 54. The electric cells 52 may be held in place in spatial relationship with one another using a mold or a scaffolding. The electric cells 52 may be held in place and positioned within a mold or other encasing surrounding the electric cells 52. In further examples, the electric cells 52 may be arranged in a desired final position in spatial relationship to one another and placed within the battery case 54, for example resting on the inside surface of the bottom 66 of the battery case 54. Once the desired arrangement of the electric cells 52 is attained, the potting compound 56 may be formed by flowing a potting composition around the electric cells 52 and through the gap 80 or spaces defined between adjacent electric cells 52. The potting composition may be applied as a liquid such that the potting composition flows through the gap 80 defined between adjacent electric cells 52 and between the electric cells 52 and the wall 70 of the battery case 54. As describe above, the potting composition may be configured to be applied as a liquid which hardens into a solid after being applied and forms the potting compound 56. In some embodiments the potting composition may be reactive such that the potting composition is applied as a liquid that flows around the electric cells 52 and through the gap 80 defined between adjacent electric cells 52 and then hardens after the completion of the reaction.

The potting composition can flow through the gap 80 between adjacent electric cells 52 and settle at a level height around the electric cells 52 and in the gap 80 or spaces defined between the electric cells 52. For example, referring to FIG. 3, the potting composition may be poured into the battery case 54 having the electric cells 52 arranged within. The liquid potting composition has sufficient flowability before curing to permit the liquid potting composition to flow through the spaces defined by the gap 80 between the adjacent electric cells 52 and/or between an electric cell and the battery case 54. The liquid potting composition has sufficient flowability to settle at a substantially level height before curing to form the potting compound.

As used herein flowability refers to the ease with which a substance will move under a certain set of conditions. Some of these conditions may include the temperature of the substance, the viscosity of the substance, or the size of the space through which the substance can flow through. For example, for the potting composition that is a liquid, the flowability of the liquid governs how it will behave when poured and how well it flows between adjacent electric cells and/or the between an electric cell and the battery case.

In a preferred embodiment, the potting composition has sufficient flowability such that the potting composition can be poured around an electric cell or the electric cells 52 and settles at a substantially level height around the electric cell or electric cells 52 before the potting composition hardens to form the potting compound 56. That is, the potting composition has sufficient flowability to disperse to a height 86 that is substantially the same at various locations around the electric cells 52 (e.g. throughout the battery case 54) before curing to form the potting compound.

In some embodiments, to determine a substantially level height, the height 86 of the potting compound 56 can be measured from the bottom 82 of the potting compound to the top 84 of the potting compound 56. This height can be measured at various locations throughout the potting compound 56, for example near the wall of the battery case 54, and towards the center of the battery case 54, such as equidistant from two opposing sides of the case. As used herein, a substantially level height means that measurements of the height 86 of the potting compound at various locations are within 20 percent of one another.

In some instances, a test for determining a substantially level height of the potting compound 56 may be as follows. For a battery, such as the battery module 50, having electric cells 52 arranged next to each other, if the electric cells 52 are the same length, and are positioned the same distance from the bottom and/or top of the battery case 54, the potting compound is at a substantially level height if the potting compound 56 is approximately the same distance along the length of each of the electric cells 52. As used herein, approximately the same distance is defined as each of the measurements of distance are within 20 percent of one another. In some instances, this test may be used to determine a substantially level height of the potting compound 56 when the average size of each gap 80 between adjacent electric cells 52 is, for example, from about one mm to about three mm wide.

Having a potting composition having sufficient flowability to form a substantially level height forms a potting compound that encapsulates each of the electric cells at substantially the same height. This provides a consistent amount of encapsulation around each of the electric cells. This may ensure suitable encapsulation of the electric cells 52 to ensure suitable level of protection, such as a suitable amount of structural stability and/or a suitable amount of flame retardant to contain a fire or flames. Having a potting compound having a substantially level height may help the weight of the battery module 50 to be balanced throughout the battery module 50. Suitable balance, or weight distribution, helps the battery module 50 to remain stable, for example when used in a moving vehicle. A suitably balanced battery module may be preferred for use in a vehicle, as it may have less of a tendency to rock or tilt in response to external forces, such as side to side, or front to back, acceleration.

Having a battery module that is low weight may be preferred, as this may make the battery module more portable, and may reduce the amount of energy required to move the battery module. For example, in an electric vehicle, it may be advantageous to have a lighter battery module that can produce the same amount of power as a heavier embodiment. One option for accomplishing this may be to use the same type and number of electric cells but reduce the weight of other components. Reducing the density of the potting compound may help to reduce the overall weight of the potting compound, without reducing other desirable qualities. Having the flame retardant component also helps reduce the likelihood of an uncontrolled fire from the battery module.

After being fully cured, the potting compound, may have a certain degree of elasticity, thereby buffering shock or vibrations imparted to the battery module when the battery module is in use. This may help prevent safety problems caused by collision among the electric cells, and/or detachment of the electric cells from the wires.

The cured potting compound may have a certain degree of porosity, controlled such that if one electric cell is involved in a safety problem and leaks, any leaking material such as fluid or gas will be contained and isolated by the potting compound positioned among the adjacent electric cells, so as to improve the safety performance of the battery module. In addition, the battery module has the advantages of simple structure, low density, small size, and low cost.

A potting compound that has a low density, contains a flame retardant, and that is a foam is disclosed. The potting compound is suitable for use in forming a battery module. A potting composition having suitable flowability to form the potting compound having a substantially level height throughout the battery module is also disclosed.

Figure 4:
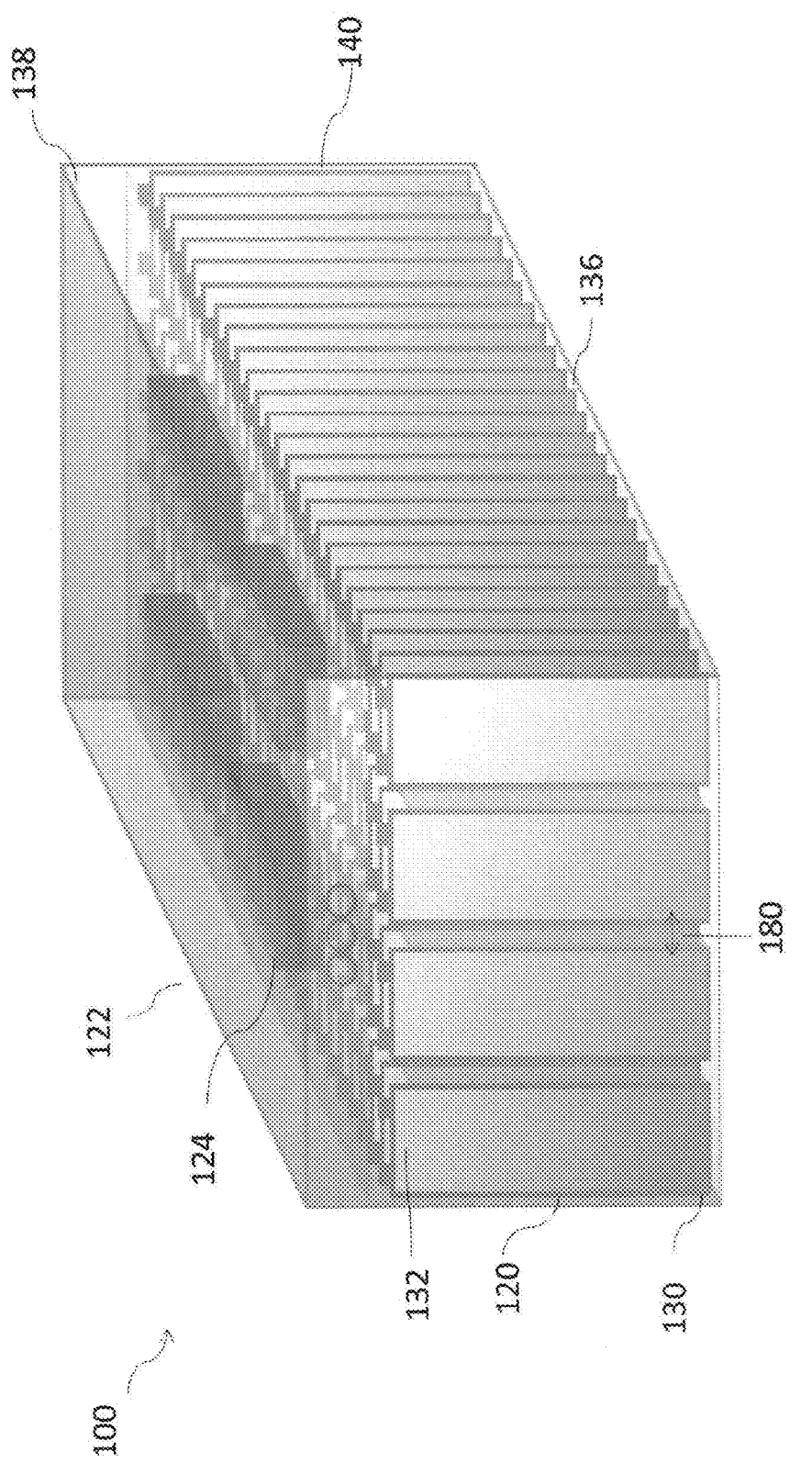
FIG. 4 is a perspective view of a battery module, in accordance with certain embodiments.

FIG. 4 is a perspective view of an example battery module 100. As shown in FIG. 4, the battery module 100 includes an electric cell 120 and a battery case 122. In some embodiments, the battery module 100 includes more than one electric cell 120. The electric cell 120 may be any suitable shape which generally has a bottom 130, a top 132 and a length defined therebetween. The battery case 122 may be any suitable shape for positioning the electric cell 120 within the battery case 122. The battery case 122 may be any suitable three dimensional shape which generally has a bottom 136, a top 138, and a wall 140 defined therebetween. The bottom 136 of the battery case 122 defines an inner surface and an outer surface; the wall 140 of the battery case 122 defines an inner surface and an outer surface. The battery case 122 defines an enclosed space having an internal volume.

As shown, the electric cell 120 may be positioned within the battery case 122. As also shown, the electric cell 120 is associated with a potting compound 124. The potting compound 124 is positioned within the battery case 122 and occupies a portion of the internal volume of the battery case 122.

In some embodiments, the battery case 122 forms an enclosed space that surrounds the electric cell 120 and other components such as wires, terminals, or connections. The enclosed space defines the internal volume of the battery case 122. The top 138 of the battery case 122, may define an opening. The top 138 may be shaped and sized to receive a cover that can be closed to separate the internal volume of the enclosed space from the outside of the battery case 122. The battery case 122 may be configured to provide mechanical or structural support to the electric cell 120. The battery case 122 may be configured to provide protection from potential damage to the electric cell 120, e.g., moisture, heat, cold, chemicals, shock, vibration, puncturing, or flames. In some embodiments, the battery case 122 may be configured to receive the potting compound 124 relative to the electric cell 120, including e.g., below an electric cell 120, between a first and an adjacent electric cell 120, above an electric cell 120, or between the electric cell 120 and the wall 140 of the battery case.

In some embodiments, a process for positioning the potting compound 124 in relation to the electric cell 120 includes first positioning the electric cell 120 inside the battery case 122. One or more electric cells 120 can be positioned together in the battery case with a gap 180 defined between adjacent electric cells 120. In some embodiments, a gap 180 may also be defined between the electric cell 120 and the wall 140 of the battery case 122. In some examples, the potting compound 124 can be prepared in a separate container and then poured into the battery case 122. For example, the components of the potting compound 124 can be mixed to form a composition that is curable to form a foam, and then the foam can be applied to the top 132 of the electric cell 120. The potting compound 124 can be added such that a layer of potting compound 124 having a thickness is disposed over the top 132 of the electric cell 120. In some embodiments, the potting compound 124 can be positioned in the gap 180 between adjacent electric cells 120. The potting compound 124 can be positioned in the gap 180 between the wall 120 and the electric cell 120. The potting compound 124 can be positioned such that a space is defined between the top of the potting compound 124 and the top 138 of the battery case 122. In some embodiments, an amount of potting compound 124 can be cured into a suitable preformed shape, and the preformed shape can be added into the battery case 122 in a suitable position relative to the electric cell 120.

Figure 5:
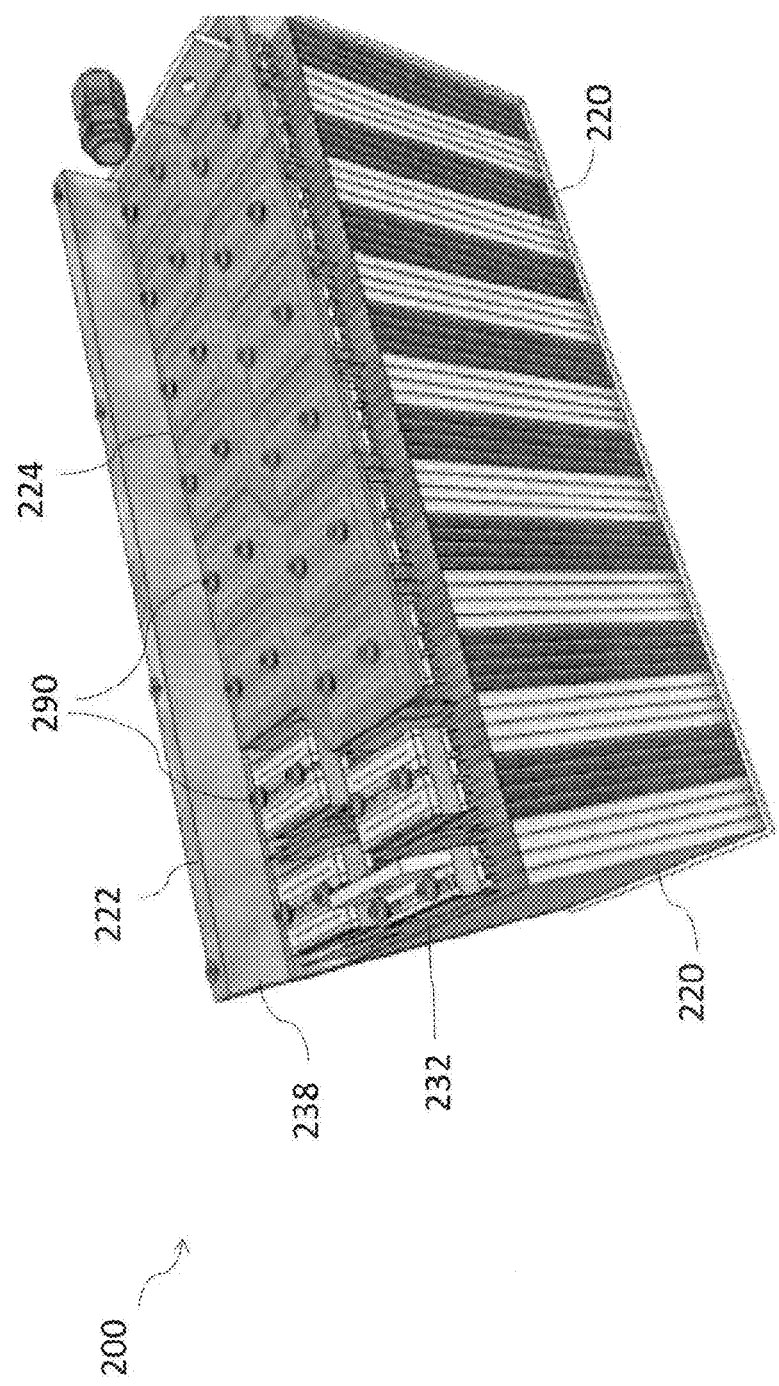
FIG. 5 is a top view of a battery module, in accordance with some embodiments.

FIG. 5 is a top view of an example battery module 200. The battery module 200 includes electric cells 220 positioned adjacent to one another. As shown in FIG. 5, the electric cells 220 are positioned within a battery case 222 that has a top 238. The battery case 222 defines an internal volume. As shown, the battery case 222 is sized such that the electric cells 222 can be positioned within the internal volume of the battery case 222 with a space between the top 232 of the battery case 222 and the top 232 of the electric cells 220. Also shown is a potting compound 224 positioned within the internal volume of the battery case 222. As shown, the potting compound 224 has a generally planar shape and extends along the top 232 of the electric cells 220. The potting compound 224 can be configured such that the terminals 290 of the electric cells 220 are accessible to a user. In some embodiments, the electric cells 220 include terminals 290 positioned on a top 232 of the electric cells 220. The potting compound 224 can be positioned around the terminals 290 and between the top 232 of the electric cells 220 and the top 238 of the battery case 222.

In some embodiments, a process for positioning the potting compound 224 in relation to the electric cells 220 includes first positioning the electric cells 220 inside the battery case 222. The potting compound 224 can be prepared in a separate container and then poured into the battery case 222. A suitable amount of potting compound 224 can be added such that a layer of potting compound 224 having a thickness is disposed at least one of over the top 232 of the electric cells 220 or in between adjacent electric cells 220. In some embodiments, the potting compound 224 can be added such that the layer of potting compound 224 has a thickness suitable to cover the tops 232 of the electric cells 220 with the terminals 290 protruding through the thickness of the potting compound 224. The potting compound can maintain the electric cells 220 in spatial relationship with each other, e.g., by holding the electric cells 220 in relation to each other such as by potting or encapsulating the terminals 290.

Figure 6:
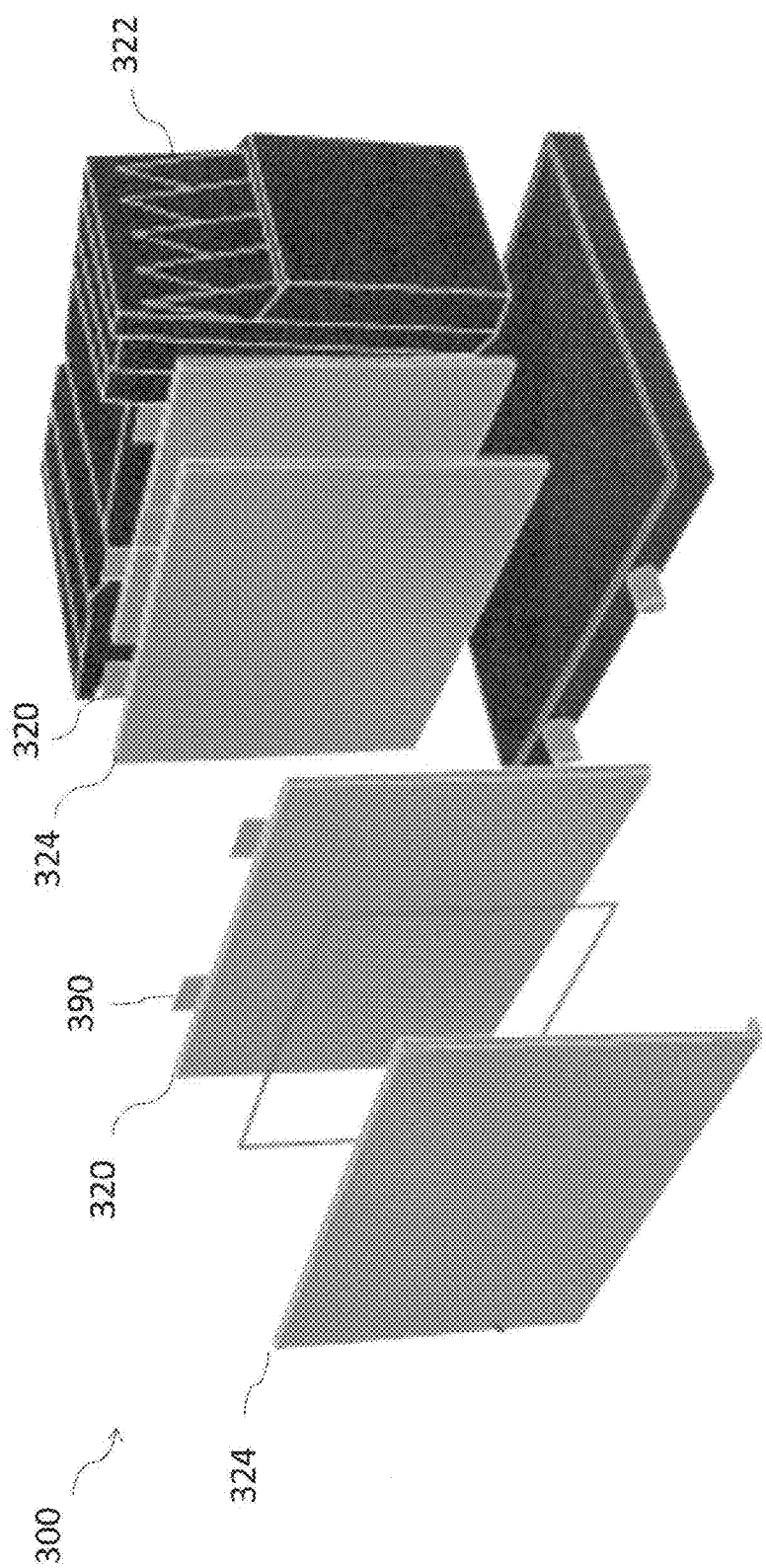
FIG. 6 is an exploded view of a battery module, in accordance with some embodiments.

FIG. 6 is an exploded view of an example battery module 300. The battery module 300 includes electric cells 320 positioned adjacent to one another. In some embodiments, the battery module 300 includes a battery case 322. The electric cells 220 are shown with terminals 290 positioned on a top 232 of the electric cells 220. Also shown is a potting compound 324 associated with the electric cells 320. As shown in FIG. 6, the electric cells 320 can have a generally planar shape. As shown, a section of the potting compound 224 has a generally planar shape. In some configurations, a section of potting compound 324 can be positioned in between adjacent electric cells 320. For example, a section of potting compound 324 can have a planar shape and be positioned parallel to the plane of the electric cells 320.

In some embodiments, a process for positioning the potting compound 324 in relation to the electric cells 320 includes first positioning the electric cells 320 in spatial relationship to one another and then the potting compound 324 can be positioned into a space defined between adjacent electric cells 320. For example, the potting compound 324 can be poured into and cure in the space between adjacent electric cells 320. As a further example, the potting compound 324 can be cured and formed into a preformed section which can then be positioned in the space between adjacent electric cells 320. A suitable amount of potting compound 324 can be provided such that a section of potting compound 324 having a suitable thickness is disposed between adjacent electric cells 220. In some embodiments, a section of potting compound 224 can be provided such that the section of potting compound 324 has a thickness suitable to provide a suitable level of flame resistance. In some embodiments, the potting compound 320 can maintain the electric cells 320 in spatial relationship with each other, e.g., absorbing shock or vibration of the battery module 300.

Examples

The following non-limiting examples are included to further illustrate various embodiments of the instant disclosure and do not limit the scope of the instant disclosure.
Test Methods:
Viscosity Test The viscosity is measured with a Brookfield Viscometer model RVF (from AMETEK Brookfield of Middleboro, Mass.), at a spindle speed of 20 rpm and at a temperature of 25° C. (77°±2° F.). The spindle used is either number 1 (up to 500 cps), number 2 (up to 2000 cps), or number 5 (up to 20,000 cps) depending on the composition being tested.
Foam Density Measurement The weight of an empty measuring device, in this case a measuring cup, was recorded to within 0.1 gram. The maximum volume of the measuring device was measured by filling the measuring device with water and recording the amount of water required to fill the internal volume of the measuring device in milliliters. The various components were weighed and add to the measuring device.

The components for producing the foam were mixed vigorously for 15-20 seconds. The sides and bottom of the measuring device were thoroughly scraped to ensure all the components reacted. The measuring device was sharply rapped by tapping measuring device on a hard surface to level the liquid. The measuring device was placed on a level surface and the foam was allowed to free rise undisturbed. The foam was allowed to cure and cool for 60-70 minutes. After curing, the top of the foam bun level was cut level with the top of the measuring device using a flat tool, in this case a knife or saw.

The measuring device containing the remaining foam was weighed, the weight in grams was recorded. The weight of the empty measuring device was subtracted from the weight of the measuring device containing the remaining foam to obtain the weight of the foam. The density was calculated by dividing the weight of the foam by the volume of the measuring device.
Flowability Test The composition to be tested is mixed with hand mixing, with a stir time of from 20 to 25 seconds. Then from 65 to 70 grams of a sample of the composition to be tested is poured into one side of a container having dimensions of 8 cm by 15 cm by 9 cm container which has 26 of type 18650 cylindrical battery cells standing upright in the container. The test is carried out at an ambient temperature that is from 21° C. to 24° C. (about 70° F. to about 75° F.).

The composition is observed with the naked eye as it flows between the cylindrical battery cells. The level that the composition settles at when cured is given a rating of unacceptable, acceptable, good, and very good depending on how well it cures at an even planar level around the battery cells. "Very good" corresponds to a height around the battery cells that is less than 10% in variation at tested locations within the container.
Burn Test The burn test was conducted in accordance with the UL 94 Test for Flammability of Plastic, Vertical Burning Test method. Burn test sample bars were prepared in a mold having the following dimensions: 125 to 152 mm long by 13 mm wide and 9.5 mm thick or 6.35 mm thick. The foam was allowed to cure in the mold for 8 to 12 hours before removing. After molding, the sample bars were conditioned at 25±2° C. and 50±5% RH for a minimum of 48 hours before testing.

The material was rated V-0 if the individual test specimen extinguished within 10 seconds after the test specimen was removed from the flame of the burner, and the total after-flame time for a set of five specimens was within 50 seconds and there was no ignition of the cotton indicator. The V-1 and V-2 rating required that the individual test specimen extinguished within 30 seconds after removal of the test specimen from flame of the burner and the total after-flame time for a set of five specimens was within 250 seconds. The V-2 rating allowed the cotton indicator to be ignited by flaming particles.

An example process for forming the potting compound is described. This same process was used for all the sample potting compounds, with the amounts of each component listed in Table 1 below.
First and Second Component Forming Process To form the first component, a liquid polyether triol was first added to a mixing vessel. The mixing was started while the liquid polyether triol was being added to the mixing vessel. The mixer speed was between 25 and 30 rpms as the liquid polyether triol was being added. The mixer speed was increased to between 600 and 800 rpms once all the liquid polyether triol was added.

In the samples where they were included, a liquid glycerin, a triethanolamine, a polyether, and an antisettling agent were then added to the mixing vessel. In the samples where they were included, a thixotrope (fumed silica), a nucleating agent, a brominated flame retardant component, and flame retardant enhancer (antimony trioxide) were then added to the mixing vessel. The contents of the mixing vessel were mixed from about 15 to about 20 minutes.

Distilled water was then added to the mixing vessel. In the samples where they were included, while the contents of the mixing vessel were being mixed, a tertiary amine catalyst and surfactant were added. A phosphate ester flame retardant was then added. The contents of the mixing vessel were mixed for about 30 minutes to form the first component. After about 30 minutes, the mixing was stopped, and the first component was emptied from the mixing vessel.

To form the second component, liquid isocyanate was added to a mixing vessel. The liquid isocyanate was mixed at a mixer speed from 25 to 30 rpms while being added to the mixing vessel. In samples having a flame retardant included in the second component, a phosphate ester flame retardant was then added to the mixing vessel. The contents of the mixing vessel were mixed for 15 to 20 minutes to form the second component. After 15 to 20 minutes, the mixing was stopped, and the second component was emptied from the mixing vessel.

Potting Composition and Potting Compound Forming Process

Suitable portions of the First Component and Second Component were poured into a mixing container. The mixing container used was larger than the amount of total material being mixed to allow for vigorous mixing. For example, for 75 grams of total material a suggested minimum size of container would be a 150 ml. container for mixing.

The higher density component was placed into the mixing container first and then the second component was gently added on top of the first component. This helped limit pre-reaction of the materials to just a reaction at the interface. The sides and bottom of the individual measuring containers were scraped to ensure nearly all the measured materials were added to the mixing container.

A timer was started, and the contents of the mixing container were vigorously mixed for 20 to 30 seconds with a flat sided stir utensil until the material was homogeneous and uniform in appearance. The sides and bottom of the mixing container were scraped during the mixing. After mixing, the contents of the mixing container were immediately poured into a mold.

To form the non-flame retardant samples, substantially the same steps were used as described for the flame-retardant material. However, no flame retardant was added to either the first or the second component.

The Comparative Examples and Samples 1 to 10 were prepared with the following components, given with the trade designation and supplier where applicable, and in the amounts set forth in Table 1: 2000 $M_n$ PPG diol polyether polyol (low viscosity polyol—EO Capped) (POLY G 55-56, available from Monument Chemical Group, of Houston, Tex.); glycerin 99.5% (triol crosslinker/humectant) (available from the Dow Chemical Company, of Midland, Mich.); triethyanolamine 99% (triol crosslinker/humectant/catalyst) (available from the Dow Chemical Company, of Midland, Mich.); fumed silica (thixotrope) (AEROSIL 200, available from Evonik Industries, of Essen, Germany); zinc stearate (nucleating agent) (NB-60, available from PMC Group, of Memphis Tenn.); zinc borate (flame retardant) (ZB-467, available from Lanxess Aktiengesellschaft, of Cologne, Germany). ethylenebistetrabromophthalimide (brominated flame retardant) (SAYTEX BT-93, available from Albemarle Corporation, of Baton Rouge, La.); distilled water (foam blowing agent); 1,4-Diazabicyclo[2.2.2]octane solution (tertiary amine catalyst) (DABCO 33 LV, available from Evonik Industries, of Essen, Germany); titanium dioxide (colorant/nucleating agent); tertiary amine catalyst (DABCO 8154, available from Evonik Industries, of Essen, Germany); 700 $M_n$ PPG triol polyol (low viscosity polyol) (POLY G 30-240, available from Monument Chemical Group, of Houston, Tex.); 700 $M_n$ polyether poyol (polypropylene oxide-based triol) (ARCOL LHT-240, available from Covestro, of Leverkusen, Germany); four-functional polyether polyol (POLY-Q 40-800E, available from Arch Chemicals, Inc. of Norwalk, Conn.); 280 $M_n$ amine/PPG tetra polyol (tetra crosslinker/humectant/catalyst) (VORANOL 800, available from The Dow Chemical Company, of Midland, Mich.); polyether polyol (VORANOL 230-238, available from The Dow Chemical Company, of Midland, Mich.); silicone surfactant (foam cell surfactant) (VORASURF DC 5160, available from Dow Chemical Company); halogenated phosphate ester (flame retardant) (FYROL PCF, available from ICL Industrial Products, of St. Louis, Mo.); trimethyl pentanyl diisobutyrate (viscosity diluent) (EASTMAN TXIB, available from Eastman Chemical Company, of Kingsport, Tenn.); phosphate ester (flame retardant) (FYROL A710, available from ICL Industrial Products, of St. Louis, Mo.); isopropylated triaryl phosphate ester (phosphorous flame retardant) (REOFOS 35, available from Lanxess Aktiengesellschaft, of Cologne, Germany); cresyl diphenyl phosphate (flame retardant) (KRONITEX CDP, available from Lanxess Aktiengesellschaft, of Cologne, Germany); antimony trioxide (flame retardant performance enhancer) (AMSPEC SELECT, available from Amspec Chemical Corporation, of Gloucester City, N.J.); modified urea solution (rheology additive/anti-settling agent) (BYK-410, available from BYK USA Inc., of Wallingford, Conn.); modified liquid MDI (isocyanate—29% NCO) (ISONATE 143L, available from The Dow Chemical Company, of Midland, Mich.); polymeric MDI (2.7 functionality) (RUBINATE M, available from Huntsman Corporation, of The Woodlands, Tex.).

The compositions were made and tested according to the test methods described above. The results and observations are set forth in Table 1.

TABLE 1

| Sample Compositions and Measured Results | | | | |
|---|---|---|---|---|
| | Comparative Example 1 | Comparative Example 2 | Sample 1 | Sample 2 |
| Component A Materials (wt. %) | | | | |
| 2000 $M_n$ PPG diol polyether polyol | 94.0 | 43.0 | 10.0 | 10.0 |
| Glycerin 99.5% | 1.00 | 3.00 | 3.00 | 3.00 |
| Triethanolamine 99% | 1.50 | 2.00 | 2.50 | 2.50 |
| Fumed silica | 1.00 | 1.00 | 0.50 | 0.50 |
| Zinc stearate | 1.00 | 1.00 | 1.00 | 1.00 |
| Zinc borate FR | 0.00 | 0.00 | 0.00 | 0.00 |
| Ethylenebistetrabromophthalimide | 0.00 | 0.00 | 0.00 | 0.00 |
| Distilled Water | 0.50 | 1.20 | 1.20 | 1.20 |
| Tertiary amine catalyst (DABCO 33LV) | 0.50 | 0.15 | 0.08 | 0.08 |

TABLE 1-continued

Sample Compositions and Measured Results

|  | | | | |
|---|---|---|---|---|
| Titanium dioxide | 0.50 | 0.50 | 0.95 | 0.95 |
| Tertiary amine catalyst (DABCO 8154) | 0.00 | 0.00 | 0.00 | 0.00 |
| 700 $M_n$ PPG triol polyol (Poly G 30-240) | 0.00 | 43.15 | 40.0 | 40.0 |
| 280 $M_n$ PPG tetra polyol (VORANOL) | 0.00 | 2.00 | 2.00 | 2.00 |
| Silicone surfactant (DC 5160) | 0.00 | 3.00 | 3.00 | 3.00 |
| Halogenated phosphate ester FR | 0.00 | 0.00 | 32.00 | 0.00 |
| Trimethyl pentanyl diisobutyrate | 0.00 | 0.00 | 3.77 | 3.77 |
| Phosphate ester FR (FYROL A710) | 0.00 | 0.00 | 0.00 | 32.0 |
| Isopropylated triaryl phosphate ester | 0.00 | 0.00 | 0.00 | 0.00 |
| Cresyl diphenyl phosphate FR | 0.00 | 0.00 | 0.00 | 0.00 |
| Antimony trioxide | 0.00 | 0.00 | 0.00 | 0.00 |
| Modified urea solution | 0.00 | 0.00 | 0.00 | 0.00 |
| Total | 100 | 100 | 100 | 100 |
| Viscosity @ 25° C. (cP) | 1500 | 800 | 400 | 350 |
| Component B Materials (wt. %) | | | | |
| Modified liquid MDI - 29% NCO | 100 | 0.00 | 0.00 | 0.00 |
| Polymeric MDI - 2.7 functionality | 0.00 | 100 | 100 | 100 |
| Phosphate ester FR (FYROL PCF) | 0.00 | 0.00 | 0.00 | 0.00 |
| Total | 100 | 100 | 100 | 100 |
| Viscosity @ 25° C. (cP) | 40 | 200 | 200 | 200 |
| Mix Ratio by Weight (100 g of A = X g of B) | 29 | 67 | 60 | 60 |
| Percent Flame Retardant in Final Blend | 0% | 0 | 20 | 20 |
| Flowability | Acceptable | Good | Very Good | Very Good |
| Foam Density (lbs/ft$^3$) | 15 | 8 | 9 | 9.9 |
| Foam Density (g/cm$^3$) | 0.24 | 0.13 | 0.14 | 0.16 |
| Foam Hardness after 24 hrs RT (Shore A) | 6 | 40 | 30 | |
| Burn Results @ Indicated Thickness (UL 94 vertical) | All Thickness Fail | All Thickness Fail | 9.5 mm = Fail | 9.5 mm = Fail |

| | Sample 3 | Sample 4 | Sample 5 | Sample 6 |
|---|---|---|---|---|
| Component A Materials (wt. %) percent) | | | | |
| 2000 $M_n$ PPG diol polyether polyol | 10.0 | 10.0 | 0.00 | 0.00 |
| Glycerin 99.5% | 3.00 | 3.00 | 3.00 | 3.00 |
| Triethanolamine 99% | 2.50 | 2.50 | 3.00 | 3.00 |
| Fumed silica | 0.50 | 0.50 | 1.00 | 1.00 |
| Zinc stearate | 1.00 | 1.00 | 1.00 | 1.00 |
| Zinc borate FR | 0.00 | 0.00 | 1.00 | 1.00 |
| Ethylenebistetrabromophthalimide | 0.00 | 0.00 | 0.00 | 0.00 |
| Distilled Water | 1.20 | 1.20 | 1.20 | 1.20 |
| Tertiary amine catalyst (DABCO 33LV) | 0.08 | 0.08 | 0.05 | 0.05 |
| Titanium dioxide | 0.95 | 0.95 | 0.00 | 0.00 |
| Tertiary amine catalyst (DABCO 8154) | 0.00 | 0.00 | 0.00 | 0.00 |
| 700 $M_n$ PPG triol polyol | 40.0 | 40.0 | 36.0 | 36.0 |
| 280 $M_n$ PPG tetra polyol | 2.00 | 2.00 | 3.00 | 3.00 |
| Silicone surfactant (DC 5160) | 3.00 | 3.00 | 2.50 | 2.50 |
| Halogenated phosphate ester FR | 0.00 | 0.00 | 48.0 | 48.0 |
| Trimethyl pentanyl diisobutyrate | 3.77 | 3.77 | 0.00 | 0.00 |
| Phosphate ester FR (FYROL A710) | 0.00 | 0.00 | 0.00 | 0.00 |
| Isopropylated triaryl phosphate ester FR | 32.0 | 0.00 | 0.00 | 0.00 |
| Cresyl diphenyl phosphate FR | 0.00 | 32.0 | 0.00 | 0.00 |
| Antimony trioxide | 0.00 | 0.00 | 0.25 | 0.25 |
| Modified urea solution | 0.00 | 0.00 | 0.00 | 0.00 |
| Total | 100 | 100 | 100 | 100 |
| Viscosity @ 25° C. (cP) | 350 | 400 | 675 | 625 |
| Component B Materials (wt. %) | | | | |
| Modified liquid MDI - 29% NCO | 0.00 | 0.00 | 0.00 | 0.00 |
| Polymeric MDI - 2.7 functionality | 100 | 100 | 100 | 55 |
| Phosphate ester FR (FYROL PCF) | 0.00 | 0.00 | 0.00 | 45 |
| Total | 100 | 100 | 100 | 100 |
| Viscosity @ 25° C. (cP) | 200 | 200 | 200 | 145 |
| Mix Ratio by Weight (100 g of A = X g of B) | 60 | 60 | 60 | 108 |
| Percent Flame Retardant in Final Blend | 20 | 20 | 30 | 46.4 |
| Flowability | Very Good | Very Good | Very Good | Very Good |

TABLE 1-continued

Sample Compositions and Measured Results

| | | | | |
|---|---|---|---|---|
| Foam Density (lbs/ft$^3$) | 9.6 | 9.8 | 7.2 | 11.7 |
| Foam Density (g/cm$^3$) | 0.15 | 0.16 | 0.12 | 0.19 |
| Foam Hardness after 24 hrs RT (Shore A) | — | — | 35 | 35 |
| Burn Results @ Indicated Thickness (UL 94 vertical) | 9.5 mm = Fail | 9.5 mm = Fail | 9.5 mm = V1 | 9.5 mm = V0 |

| | Sample 7 | Sample 8 | Sample 9 | Sample 10 |
|---|---|---|---|---|
| Component A - Materials (wt. %) | | | | |
| 2000 M$_n$ PPG diol polyether polyol | 0.00 | 0.00 | 0.00 | 0.00 |
| Glycerin 99.5% | 3.00 | 3.00 | 3.10 | 3.20 |
| Triethanolamine 99% | 3.00 | 3.00 | 2.90 | 2.90 |
| Fumed silica | 0.70 | 0.70 | 0.70 | 0.70 |
| Zinc stearate | 1.00 | 1.00 | 1.00 | 1.00 |
| Zinc borate FR | 0.00 | 0.00 | 0.00 | 0.00 |
| Ethylenebistetrabromophthalimide | 1.00 | 1.00 | 1.00 | 1.00 |
| Distilled Water | 1.30 | 1.30 | 1.30 | 1.30 |
| Tertiary amine catalyst (DABCO 33LV) | 0.05 | 0.05 | 0.05 | 0.02 |
| Titanium dioxide | 0.00 | 0.00 | 0.00 | 0.00 |
| Tertiary amine catalyst (DABCO 8154) | 0.00 | 0.00 | 0.00 | 0.01 |
| 700 M$_n$ PPG triol polyol | 36.0 | 36.0 | 36.1 | 36.4 |
| 280 M$_n$ PPG tetra polyol | 3.00 | 3.00 | 2.90 | 2.80 |
| Silicone surfactant (DC 5160) | 2.50 | 2.50 | 2.50 | 0.55 |
| Halogenated phosphate ester FR | 47.2 | 47.2 | 47.2 | 48.9 |
| Trimethyl pentanyl diisobutyrate | 0.00 | 0.00 | 0.00 | 0.00 |
| Phosphate ester FR (FYROL A710) | 0.00 | 0.00 | 0.00 | 0.00 |
| Isopropylated triaryl phosphate ester | 0.00 | 0.00 | 0.00 | 0.00 |
| Cresyl diphenyl phosphate FR | 0.00 | 0.00 | 0.00 | 0.00 |
| Antimony trioxide | 1.00 | 1.00 | 1.00 | 1.00 |
| Modified urea solution | 0.30 | 0.30 | 0.30 | 0.30 |
| Total | 100 | 100 | 100 | 100 |
| Viscosity @ 25° C. (cP) | 437 | 425 | 362 | 360 |
| Component B - Materials (wt. %) | | | | |
| Modified liquid MDI - 29% NCO | 0.00 | 0.00 | 0.00 | 0.00 |
| Polymeric MDI - 2.7 functionality | 70 | 80 | 70 | 70 |
| Phosphate ester FR (FYROL PCF) | 30 | 20 | 30 | 30 |
| Total | 100 | 100 | 100 | 100 |
| Viscosity @ 25° C. (cP) | 162 | 180 | 160 | 160 |
| Mix Ratio by Weight (100 g of A = X g of B) | 86 | 76 | 86 | 87 |
| Percent Flame Retardant in Final Blend | 39.7 | 35.8 | 39.7 | 40 |
| Flowability | Very Good | Very Good | Very Good | Very Good |
| Foam Density (lbs/ft$^3$) | 8.9 | 8.3 | 9.7 | 10 |
| Foam Density (g/cm$^3$) | 0.14 | 0.13 | 0.16 | 0.16 |
| Foam Hardness after 24 hrs RT (Shore A) | 40 | 40 | 35 | 40 |
| First Burn Results @ Indicated Thickness (UL 94 vertical) | 9.5 mm = V0 | 9.5 mm = V0 | 9.5 mm = V0 | 9.5 mm = V0 |
| Second Burn Results @ Indicated Thickness (UL 94 vertical) | — | — | 6.35 mm = V0 | 6.35 mm = V0 |

Samples 11 to 14 were prepared with a similar process as described for Samples 1 to 10. Samples 11 to 14 were prepared with the following components, given with the trade designation and supplier where applicable, and in the amounts set forth in Table 2: glycerin 99.5% (triol cross-linker/humectant) (available from the Dow Chemical Company, of Midland, Mich.); triethyanolamine 99% (triol cross-linker/humectant/catalyst) (available from the Dow Chemical Company, of Midland, Mich.); fumed silica (thixotrope) (TS-720, available from the Cabot Corp., of Boston, Mass.); zinc stearate (nucleating agent) (NB-60, available from PMC Group, of Memphis Tenn.); ethylen-ebistetrabromophthalimide (brominated flame retardant) (SAYTEX BT-93, available from Albemarle Corporation, of Baton Rouge, La.); distilled water (foam blowing agent); 1,4-Diazabicyclo[2,2,2]octane solution ((first) tertiary amine catalyst) (DABCO 33 LV, available from Evonik Industries, of Essen, Germany); (second) tertiary amine catalyst (DABCO DMDEE, available from Evonik Industries, of Essen, Germany); 700 M$_n$ PPG triol polyol) (low viscosity polyol) (POLY G 30-240, available from Monument Chemical Group, of Houston, Tex.); 280 M$_n$ amine/PPG tetra polyol (tetra crosslinker/humectant/catalyst) (VORANOL 800, available from The Dow Chemical Company, of Midland, Mich.); silicone surfactant (foam cell surfactant) (VORASURF DC 5160, available from the Dow Chemical Company); halogenated phosphate ester (flame retardant) (FYROL PCF, available from ICL Industrial Products, of St. Louis, Mo.); silicone surfactant (EPH 190, available from Evonik Industries); diamine (curing agent) (LONZACURE DETDA 80, available from Lonza, Inc., of Allendale, N.J.); antimony trioxide (flame retardant performance enhancer) (AMSPEC SELECT, available from Amspec Chemical Corporation, of Gloucester City, N.J.); modified urea solution (rheology additive/anti-settling agent) (BYK-410/BYK-430, available from BYK USA Inc., of Wallingford, Conn.); fumed silica (TS-720); polymeric MDI (2.7 functionality) (RUBINATE M, available from Huntsman Corporation, of The Woodlands, Tex.); halogenated phosphate ester (FYROL PCF): silicone surfactant (VORASUF DC 5098, available from, the Dow Chemical Company).

The compositions were made and tested according to the test methods described above. The results and observations are set forth in Table 2.

TABLE 2

Sample Compositions and Measured Results

| | Sample 11 | Sample 12 | Sample 13 | Sample 14 |
|---|---|---|---|---|
| Component A - Materials (wt. %) | | | | |
| Glycerin 99.5% | 2.00 | 2.00 | 2.00 | 3.20 |
| Triethyanolamine 99% | 2.40 | 2.40 | 2.40 | 2.85 |
| Fumed silica | 4.25 | 4.25 | 4.25 | 5.00 |
| Zinc stearate | 0.70 | 0.70 | 0.70 | 0.70 |
| Brominated FR | 1.00 | 1.00 | 1.00 | 1.00 |
| Distilled water | 1.90 | 2.20 | 2.20 | 1.50 |
| Tertiary amine catalyst (DABCO 33LV) | 0.010 | 0.015 | 0.015 | 0.010 |
| Tertiary amine catalyst (DABCO DMDEE) | 0.010 | 0.015 | 0.015 | 0.010 |
| 700 $M_n$ PPG triol polyol | 36.2 | 36.3 | 36.3 | 36.5 |
| 280 $M_n$ amine/PPG tetra polyol | 2.40 | 2.40 | 2.40 | 2.80 |
| Silicone surfactant (DC 5160) | — | — | — | 0.40 |
| Halogenated phosphate ester FR | 43.4 | 42.6 | 42.7 | 44.7 |
| Silicone surfactant (EPH 190) | 1.50 | 1.75 | 1.75 | — |
| Diamine curing agent | 3.00 | 3.00 | 3.00 | — |
| Antimony trioxide | 1.00 | 1.00 | 1.00 | 1.00 |
| Modified urea solution | 0.30 | 0.40 | 0.30 | 0.30 |
| Total | 100 | 100 | 100 | 100 |
| Part A Viscosity @ 25° C. (cps) | 12950 | 12000 | 12800 | 17200 |
| Component B - Materials (wt. %) | | | | |
| Fumed Silica | 2.80 | 2.80 | 2.80 | 6.00 |
| Polymeric MDI - 2.7 funct. | 67 | 67 | 67.0 | 67.0 |
| Halogenated phosphate ester FR | 30 | 30 | 30. | 27.0 |
| Silicone surfactant (DC 5098) | 0.20 | 0.20 | 0.20 | — |
| Total | 100 | 100 | 100 | 100 |
| Viscosity @ 25 C. (cps) | 5262 | 5000 | 5200 | 9825 |
| Mix Ratio by Weight (100 gm of A = X g of B) | 93 | 96 | 96 | 86 |
| Percent Flame Retardant in Final Blend | 37.4 | 36.9 | 36.9 | 37.1 |
| Foam Density (lbs/ft$^3$) | 10.50 | 7.80 | 9.0 | 9.5 |
| Foam Density (g/cm$^3$) | 0.17 | 0.13 | 0.14 | 0.15 |
| First Burn Results @ Indicated Thickness (UL 94 vertical) | 6.35 mm = V0 | 6.35 mm = V0 | 6.35 mm = V0 | 6.35 mm = V0 |

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A method of potting an electric cell, the method comprising:
    positioning a liquid potting composition in a space defined between a side of a first electric cell positioned in a container and at least one of a side of a second electric cell and a side of the container;
    allowing the liquid potting composition to flow to a substantially level height in the container; and
    allowing the potting composition to harden to form a potting compound,
    the liquid potting composition comprising:
        an isocyanate reactive compound;
        a blowing agent;
        an isocyanate compound; and
        a liquid flame retardant component in an amount greater than 10% by weight.

2. The method of claim 1, wherein the liquid potting composition comprises the liquid flame retardant component in an amount greater than 15% by weight.

3. The method of claim 1, wherein the liquid potting composition comprises the liquid flame retardant component in an amount greater than 20% by weight.

4. The method of claim 1, wherein the liquid potting composition comprises the liquid flame retardant component in an amount greater than 30% by weight.

5. The method of claim 1, wherein the potting compound is a polyurethane foam potting compound exhibiting at least a V2 level flame resistance as measured by the UL 94 Test for Flammability of Plastics using a sample having a width of 13 mm and a thickness of 9.5 mm.

6. The method of claim 1, wherein the potting compound is a polyurethane foam potting compound exhibiting at least a V0 level flame resistance as measured by the UL 94 Test for Flammability of Plastics using a sample having a width of 13 mm and a thickness of 9.5 mm.

7. The method of claim 1, wherein the potting compound is a polyurethane foam potting compound having a density of less than 0.60 g/cm$^3$.

8. The method of claim 1, wherein the liquid flame retardant component exhibits a viscosity from 30 cP to 2000 cP at a temperature from about 25° C. to about 35° C.

9. The method of claim 1, wherein the liquid potting composition includes a liquid phosphate ester in an amount greater than 15% by weight.

10. The method of claim 1, wherein the liquid potting composition includes a liquid halogenated phosphate ester in an amount greater than 15% by weight.

11. The method of claim 1, wherein the isocyanate reactive compound exhibits a viscosity from greater than one cP to less than 800 cP, the isocyanate compound exhibits a viscosity from greater than one cP to less than 1000 cP, and the liquid flame retardant component exhibits a viscosity from 30 cP to 300 cP, all at a temperature from 25° C. to 35° C.

12. A method of potting an electric cell, the method comprising:
  positioning a liquid potting composition in an enclosed space defined by a wall of a case, the case containing at least one electric cell,
  the liquid potting composition comprising:
    a first component comprising an isocyanate reactive compound and a blowing agent;
    a second component comprising an isocyanate compound; and
    at least one of the first and second component including a flame retardant component in an amount greater than 10% by weight based on the total weight of the liquid potting composition,
    wherein at least one of (a) and (b) are exhibited:
      (a) the first component has a viscosity from greater than one cP to less than 1500 cP at 25° C., and
      (b) the second component has a viscosity from greater than one cP to less than 1000 cP at 25° C.

13. The method of claim 12 further comprising allowing the liquid potting composition to flow to a substantially level height in the case before forming a potting compound.

14. The method of claim 13, wherein the potting compound is a polyurethane foam potting compound having a density of less than 0.60 g/cm$^3$.

15. The method of claim 12, wherein the first component has a viscosity from greater than one cP to less than 1500 cP, and wherein the second component has a viscosity from greater than one cP to less than 1000 cP, all at a temperature from 25° C. to 35° C.

16. The method of claim 12, wherein the liquid potting composition comprises the flame retardant component in an amount greater than 15% by weight.

17. The method of claim 12, wherein the liquid potting composition comprises the flame retardant component in an amount greater than 20% by weight, and the flame retardant component is a liquid phosphate ester.

18. The method of claim 12, wherein the liquid potting composition comprises the flame retardant component in an amount greater than 30% by weight.

19. The method of claim 12, wherein the flame retardant component exhibits a viscosity from 30 cP to 2000 cP at a temperature from about 25° C. to about 35° C.

20. The method of claim 12, wherein the flame retardant component includes a liquid phosphate ester in an amount greater than 15% by weight.

21. The method of claim 12, wherein the flame retardant component includes a liquid halogenated phosphate ester in an amount greater than 15% by weight.

22. A method of potting an electric cell, the method comprising:
  positioning a liquid potting composition in a space defined between a side of a first electric cell positioned in a container and at least one of a side of a second electric cell and a side of the container,
  the liquid potting composition having sufficient flowability such that the liquid potting composition settles at a substantially level height in the space before forming a polyurethane foam potting compound exhibiting at least a V2 level flame resistance as measured by the UL 94 Test for Flammability of Plastics using a sample having a width of 13 mm and a thickness of 9.5 mm.

23. The method of claim 22, wherein the foam polyurethane potting compound exhibits at least a V0 level flame resistance as measured by the UL 94 Test for Flammability of Plastics.

24. The method of claim 22, wherein the foam polyurethane potting compound has a density of less than 0.60 g/cm$^3$.

25. The method of claim 22, wherein the liquid potting composition includes a liquid phosphate ester in an amount greater than 15% by weight.

26. The method of claim 12, wherein the liquid potting composition includes a liquid halogenated phosphate ester in an amount greater than 15% by weight.

* * * * *